United States Patent
Heckmeier et al.

(10) Patent No.: US 7,553,522 B2
(45) Date of Patent: Jun. 30, 2009

(54) LC-MIXTURES WITH LOW FREQUENCY DEPENDENCE FOR TFT-DISPLAYS

(75) Inventors: Michael Heckmeier, Hemsbach (DE); Brigitte Schuler, Grossostheim (DE); Aisuraka Manabe, Bensheim (DE); Elvira Monrenegro, Weinheim (DE)

(73) Assignee: Merck Patent GmbH, Darmstadt (DE)

( * ) Notice: Subject to any disclaimer, the term of this patent is extended or adjusted under 35 U.S.C. 154(b) by 325 days.

(21) Appl. No.: 11/497,513

(22) Filed: Aug. 2, 2006

(65) Prior Publication Data
US 2007/0034829 A1 Feb. 15, 2007

(30) Foreign Application Priority Data

Aug. 3, 2005 (EP) .................................. 05016870
Dec. 20, 2005 (EP) .................................. 05027841

(51) Int. Cl.
*C09K 19/12* (2006.01)
*C09K 19/20* (2006.01)
*C09K 19/30* (2006.01)
*C09K 19/52* (2006.01)

(52) U.S. Cl. .............. 428/1.1; 252/299.01; 252/299.63; 252/299.66; 252/299.67

(58) Field of Classification Search ............ 252/299.01, 252/299.63, 299.66, 299.67; 349/177; 428/1.1

See application file for complete search history.

(56) References Cited

U.S. PATENT DOCUMENTS 6,419,999 B1 * 7/2002 Tarumi et al. ................ 428/1.1

* cited by examiner

*Primary Examiner*—Shean C Wu
(74) *Attorney, Agent, or Firm*—Millen, White, Zelano, Branigan, P.C.

(57) ABSTRACT

The present invention relates to dielectrically positive, nematic liquid crystalline media having a small frequency dependence of the dielectric anisotropy. The media are particularly well suited for application in active matrix displays. The present invention relates to the use of the inventive media in active matrix displays, as well as to these active matrix displays themselves.

18 Claims, No Drawings

LC-MIXTURES WITH LOW FREQUENCY DEPENDENCE FOR TFT-DISPLAYS

The present invention relates to a liquid-crystalline medium and to electro-optical displays containing this medium.

Liquid crystals are used, in particular, as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (superbirefringence effect) cells and OMI (optical mode interference) cells. The most common display devices are based on the Schadt-Helfrich effect and have a twisted nematic structure.

The liquid-crystal materials must generally have good chemical and thermal stability and good stability to electric fields and electromagnetic radiation. Furthermore, the liquid-crystal materials should have low viscosity and give short response times, low threshold voltages and high contrast in the cells.

They should furthermore have a suitable mesophase, for example a nematic mesophase for the abovementioned cells, at conventional operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, must satisfy various requirements depending on the cell type and area of application. For example, materials for cells having a twisted nematic structure should have positive dielectric anisotropy and low electrical conductivity.

For example, liquid-crystalline media having large positive dielectric anisotropy, broad nematic phases, relatively low birefringence, very high resistivity, good light and temperature stability and low vapor pressure are desired for matrix liquid-crystal displays containing integrated non-linear elements for switching individual pixels (MLC displays).

Matrix liquid-crystal displays of this type are known. Non-linear elements which can be used for individual switching of the individual pixels are, besides passive elements such as varistors or diodes, active elements such as transistors. This case is then referred to as an "active matrix".

In the promising TFT (thin film transistor) displays, the electro-optical effect utilized is usually the TN effect. A distinction is made between TFTs comprising compound semiconductors, for example CdSe, or TFTs based on polycrystalline or amorphous silicon.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be expanded to fully color-compatible displays, in which a mosaic of red, green and blue filters is arranged in such a way that each filter element is located opposite a switchable pixel. The TFT displays usually operate as TN cells with crossed polarizers in transmission and are backlit.

MLC displays of this type are used as displays in notebook computers, for televisions (pocket TVs) or in automobile or aircraft construction. Besides, difficulties can arise in these MLC displays due to inadequate frequency dependence of the dielectric anisotropy $\Delta\varepsilon$. If a display is triggered at low temperatures with a frequency at which $\Delta\varepsilon$ is already low because of its frequency dependence than only a part of the pixel capacity is charged during the open-period of the gate of the transistor. At a constant charge, an desirable high voltage is applied to the liquid crystal. Thereby, the optical properties of the liquid crystal degrade. Consequently, there is a great demand for liquid-crystal mediums in which the frequency dependence of the dielectric constant is as flat as possible even at low temperature. To achieve short display response times, the mixtures must furthermore have a small rotational viscosity. To be able to use the displays even at low temperatures, for example for outdoor, automobile or avionics applications, it is required that crystallization and/or smectic phases do not occur even at low temperatures, and that the temperature dependence of the viscosity is as low as possible.

It is an object of the invention to provide liquid-crystalline media TN displays which have a frequency dependence of the dielectric constant as flat as possible even at low temperatures.

This object of the present invention is achieved by a liquid-crystalline medium with a nematic phase wherein the liquid-crystalline medium preferably has a dielectric relaxation frequency of more than 200 kHz or more, more preferably of 300 kHz or more, and most preferably of 400 kHz or more, at a temperature of 0° C. In this respect the relaxation frequency is defined as the frequency at which the slope of the dielectric anisotropy as a function of the frequency has a maximum (i.e. an extreme value). It is referred to below in terms of $v_{Turn}$/kHz. Upon further study of the specification and appended claims, further objects and advantages of this invention will become apparent to those skilled in the art.

It has been found according to the present invention, that the frequency dependence of the dielectric constant of liquid-crystalline medium is as flat as possible if the dielectric relaxation frequency is in the aforementioned range.

It is preferred that the liquid-crystalline medium has a clearing point of 70° C. or more, preferably of 75° C. or more and most preferably of 80° C. or more.

The liquid-crystalline medium preferably has a nematic phase, which is stable in a temperature range at least from −20° C. to 70° C., more preferably from −30° C. to 75° C., most preferably from −30° C. to 80° C. and in particular from −40° C. to 100° C.

Furthermore, it is preferred that the liquid-crystalline medium has at least one of the following additional properties:
- a high positive dielectric anisotropy ($\Delta\varepsilon$) at 20° C. and a frequency of 1 kHz of 4 or more, preferably of 6 or more and most preferably of 8 or more, allowing the realization of a low threshold voltage ($V_{th}$),
- a rotational viscosity ($\gamma_1$) of 250 mPa·s or less, preferably of 225 mPa·s or less and most preferably of 150 mPa·s or less, in order to realise short response times.

The aforementioned dielectric relaxation frequency is achieved by a definite assortment of qualified neutral, weakly polar or strongly polar substances. In the present application the term strongly dielectrically positive compounds describes compounds with $\Delta\varepsilon > 6.0$, dielectrically neutral compounds are compounds with $-1.5 < \Delta\varepsilon < 3.0$ and weakly dielectrically positive compounds are compounds with $3.0 < \Delta\varepsilon < 6.0$. Besides these three categories of substances there is a fourth category, namely dielectrically negative compounds with $\Delta\varepsilon \leq -1.5$. The same definitions which are applied to the substances are applied to components, too. For the classification of the different types of mesogenic compounds into these four classes according to their dielectric anisotropy, in case of doubt a representative compound is selected. This is the respective compound wearing one, respectively two n-propyl end groups at the respective ends of the molecular core (i.e. comprising exactly the same rings linked in the same way by the same linking groups and having the same substitution pattern). These reference compounds are used to represent, e.g., also the compounds having one or two alkenyl end groups on the same molecular core and having the same substitution pattern at the rings and the same linking groups.

$\Delta\in$ is determined at a frequency of 1 kHz and 20° C. The dielectrical anisotropies of the compounds is determined from the results of a solution of 10% of the individual compounds in a nematic host mixture. The capacities of these test mixtures are determined both in a cell with homeotropic and with homogeneous alignment. The cell gap of both types of cells is approximately 10 μm. The voltage applied is rectangular wave with a frequency of 1 kHz and a root mean square value typically of 0.5 V to 1.0 V, however, it is always selected to be below the capacitive threshold of the respective test mixture. Both for strongly and for weakly dielectrically positive compounds the mixture ZLI-4792 and for dielectrically neutral compounds the mixture ZLI-3086, both of Merck KGaA, Germany, are used as host mixture, respectively. In case the compounds of interest are not soluble in the respective host at a concentration of 10%, the concentration is successively reduced by a factor of two (i.e. halved) until the resultant solution is stably nematic. The dielectric permittivities of the compounds are determined from the change of the respective values of the host mixture upon addition of the compounds of interest and are extrapolated to a concentration of the compounds of interest of 100%. In case the components of the mixtures are nematic at 20° C. they are investigated as such. In case they have no nematic phase at 20° C. they are investigated like the single compounds.

Components having a nematic phase at the measurement temperature of 20° C. are measured as such, all others are treated like compounds.

In this application mesogenic compounds are classified according to the number of rings they include into one-ring, two-ring, three-ring, four-ring compounds and so on. In this respect the number of typical mesogenic rings consisting of four, five, six or seven atoms, (typically C atoms, some of which may be replaced by N, O and/or S atoms), which are linked in a cyclical way, which are present in the compound, are counted. In this respect bicyclic moieties (like, e.g., [2.2.2]-bicyclooctane-1,4-diyl) in the compounds are counted as one ring, whereas spiro moieties and annellated rings comprising two rings (like e.g. diyles of naphthaline, tetrahydronaphthaline, decahydronaphthaline and indane) or three rings (like, e.g., anthracene diyles) are counted as two rings. In case of doubt, whether a structure not explicitly mentioned should be counted as one ring or as two rings, the maximum width of the ring, respectively rings has to be considered. Here the limit for the maximum extension of the atoms constituting the ring, respectively the rings for the system to be regarded as one ring is 7 Angstroms (A).

Preferably the compounds predominantly used according to the present invention comprise predominantly and preferably only five-, six- or seven-membered rings, preferably five- and six-membered rings and most preferably six-membered rings In a preferred embodiment of the present invention, the liquid-crystalline medium comprises at least one strongly polar two-ring compound which has a dielectric anisotropy $\Delta\in$ of preferably more than 6.0, more preferably more than 8.0, even more preferably more than 10.0 and most preferably more than 12.0. Two-ring compounds according to this application are preferably selected from the group consisting of substances of the group of general formulae (Ia) and (Ib)

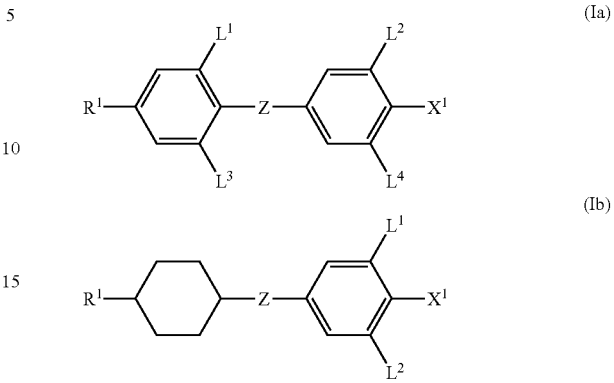

in which

L$^1$, L$^2$, L$^3$ and L$^4$ each, independently from one another, denotes hydrogen or halogen, preferably fluorine or chlorine, most preferably fluorine, R$^1$ denotes
hydrogen,
halogen, preferably fluorine,
an alkyl or alkoxy group with 1 to 7 carbon atom(s), preferably 1 to 5 carbon atom(s), or
an alkenyl, alkenyloxy, alkinyl or alkinoxy group with 7 carbon atoms, preferably 1 to 5 carbon atom(s),
wherein for all mentioned groups of R$^1$, where appropriate, one or more —CH$_2$— groups may be replaced by —O—, >C═O or —S— with the proviso that no two oxygen atoms are adjacent and wherein the for R$^1$ mentioned groups may substituted by halogen, preferably fluorine X$^1$ denotes
halogen, preferably fluorine or chlorine, a fluorinated alkyl or alkoxy groups with 1 to 5 carbon atom(s), preferably 1 to 2 carbon atom(s), a fluorinated alkenyl, alkenyloxy or oxyalkyl group with 2 to 4 carbon atom(s), —OCF$_3$, —OCHFCF$_3$ or SF$_5$;

Z denotes
a single bond, —CF$_2$O—, —OCF$_2$—, —COO—, —O—CO—, —CH$_2$CH$_2$—, —CH═CH—, —C≡C—, —CH$_2$O—, —(CH$_2$)$_4$—, —CF═CF—, CH═CF— or —CF═CH—, preferably a single bond or —CF$_2$O—.

In the liquid-crystalline medium according to the present invention it is preferred that at most three of L$^1$, L$^2$, L$^3$ and L$^4$ are F simultaneously.

The liquid-crystalline medium has preferably an amount of the strongly polar two-ring substances of 5% or more, preferably of 10% or more, more preferably of 20% or more and most preferably of 30% or more.

The liquid-crystalline medium may comprise additionally further substances selected from the group consisting of neutral two-ring substances or weakly-polar two-ring substances.

The liquid-crystalline medium according to the present invention may comprise one or more neutral two-ring substance of the general formula (II)

$$R^2\text{-}A^a\text{-}Z^2\text{-}A^b\text{-}R^3 \tag{II}$$

in which
R² denotes an alkyl radical having 1 to 15 carbon atoms
Aᵃ and Aᵇ denote, independently of each other,

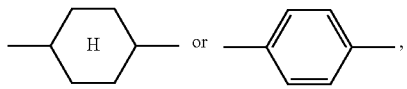

Z² denotes a single bond and
R³ denotes an alkyl, alkoxy or alkenyl radical having 1 to 15 carbon atoms or 2 to 15 carbon atoms, respectively, in which one or more —CH₂-groups may be replaced by —O— such a way that oxygen atoms are not adjacent, or F.

Preferred examples for these neutral two-ring substances are

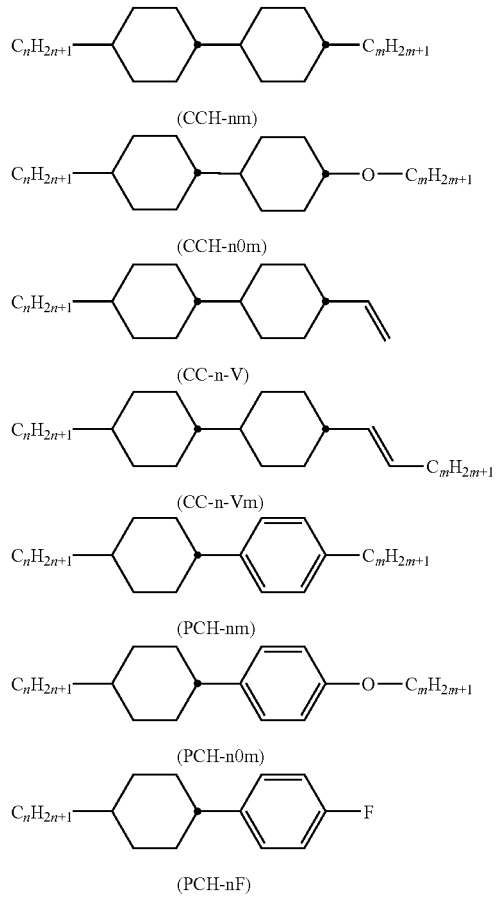

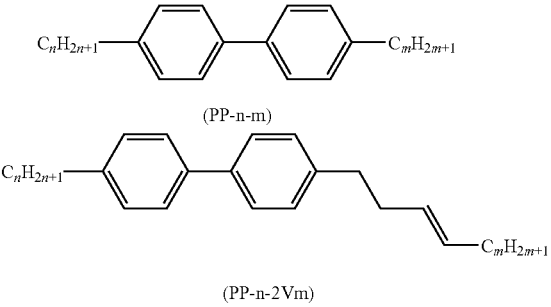

Thereby, the amount of said neutral two-ring substances of the general formula (II) in the liquid-crystalline medium is preferably 10 wt.-% or more, more preferably 20 wt.-% or more and most preferably 30 wt.-% or more.

The liquid-crystalline medium according to the present invention may comprise additionally one or more three-ring substances which correspond to the general formula (III)

$$R^4\text{-}A^c\text{-}Z^3\text{-}A^d\text{-}Z^4\text{-}A^e\text{-}Y^2 \tag{III}$$

in which
$A^c$, $A^d$ and $A^e$ denote, independently from one another,

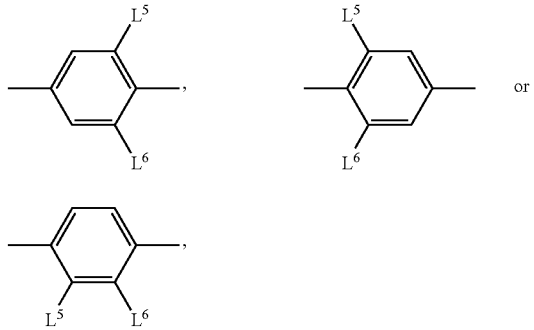

in which
L⁵ and L⁶ denote, independently from one another, hydrogen or fluorine,
and
$A^c$ and $A^d$ may alternatively additionally denote

Z³ and Z⁴ denote, independently from one another, a single bond, —CH₂—CH₂—, —CH₂—O— or —COO—,
R⁴ and Y¹ denote an alkyl, alkoxy or alkenyl radical with 1 to 7 carbon atom(s) or 2 to 7 carbon atoms, respectively, in which one or more —CH₂-groups may be replaced by —O— such a way that oxygen atoms are not adjacent,
Y¹ may additionally denote —F, —Cl, —OCF₃, —OCHF₂, —OCH₂F or —CF₃

Preferred compounds of the general formula (III) are the following compounds of the formula (IIIa) to (IIIe):

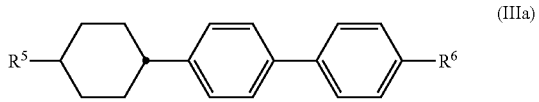
(IIIa)

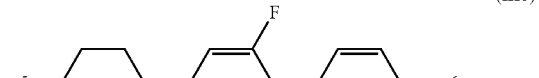
(IIIb)

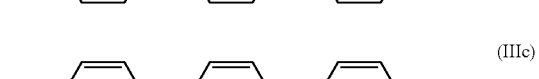
(IIIc)

-continued

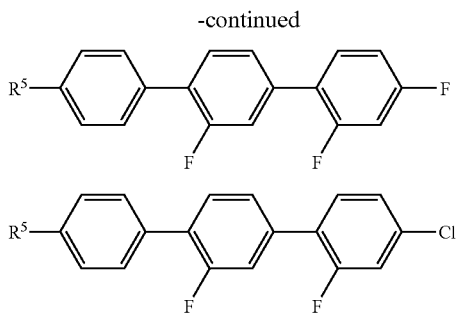

in which
R⁵ and R⁶ denote, independently from each other, an alkyl or alkenyl radical with 1 to 7 carbon atom(s) or 2 to 7 carbon atoms, respectively, in which one or more —CH₂-groups may be replaced by —O— such a way that oxygen atoms are not adjacent,
X may denote F—, Cl, —OCF₃, —OCHF₂, —OCH₂F or —CF₃.

In a preferred embodiment of the present invention, the amount of said neutral three-ring substances is preferably 20 wt.-% or more, more preferably 30 wt.-% or more and most preferably 40 wt.-% or more.

The liquid-crystalline medium according to the present invention may comprise also one or more neutral four-ring substances which correspond to the general formula (IV)

$$R^7\text{-}A^f\text{-}Z^5\text{-}A^g\text{-}A^h\text{-}Z^7\text{-}A^i\text{-}R^8 \quad (IV)$$

in which
$A^f, A^g, A^h$ and $A^i$ denote, independently from one another,

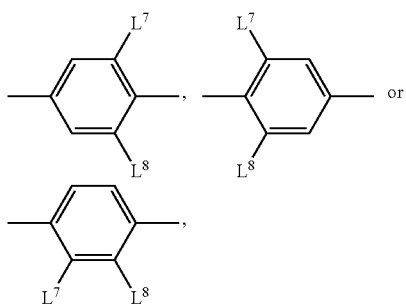

in which
L⁷ and L⁸ denote, independently from one another, hydrogen or fluor,
and
$A^f$ and $A^g$ may additionally denote

$Z^5, Z^6$ and $Z^7$ denote, independently from one another, a single bond, —CH₂—CH₂— or —COO—,
R⁷ and Y² denote an alkyl, alkoxy or alkenyl radical with 1 to 7 carbon atom(s) or 2 to 7 carbon atoms, respectively, in which one or more —CH₂-groups may be replaced by —O— such a way that oxygen atoms are not adjacent, Y² may additionally denote —F, —Cl, —OCF₃, —OCHF₂, —OCH₂F or —CF₃

Preferred compounds of the general formula (IV) are the following compounds of the formula (IVa) to (IVd):

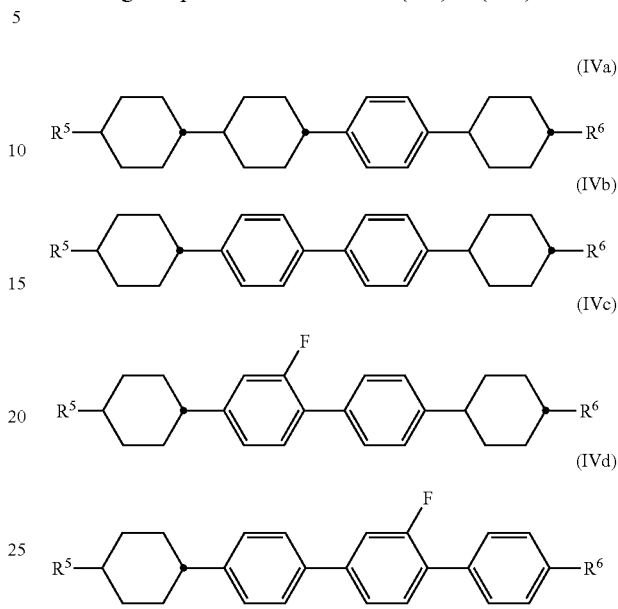

In a preferred embodiment of the present invention, the amount of said neutral four-ring substances is preferably 5 wt.-% or more, more preferably 10 wt.-% or more and most preferably 15 wt.-% or more.

According to the present invention it is preferred that the total amount of the above-mentioned neutral substances (two-ring, three-ring and four-ring) substances is preferably 20 wt.-% or more, more preferably 30 wt.-% or more, most preferably 40 wt.-% or more and in particular 50 wt.-% or more.

In another preferred embodiment of the present invention, the liquid-crystalline medium may comprise additionally weak-polar substances. If these weakly-polar substances are used in mediums according to the present invention, they are preferably 20 wt.-% or less, especially preferred 10 wt.-% or less.

Examples of weakly-polar two-ring compounds are

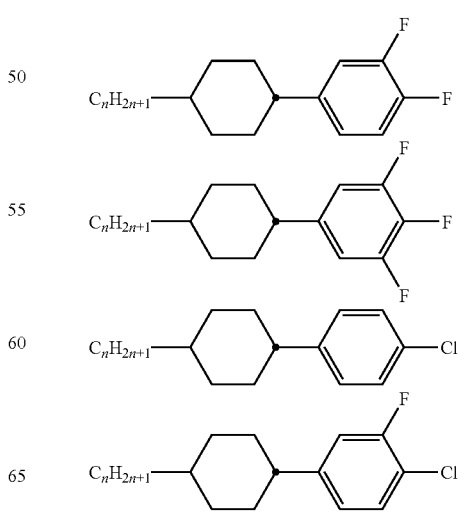

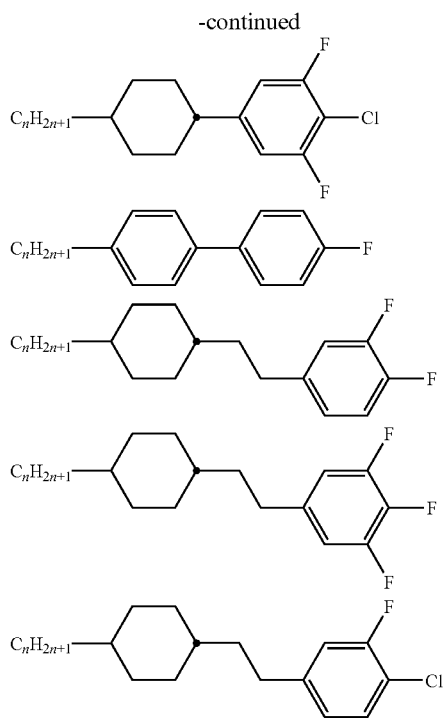
wherein n is 1 to 7.
Examples of weakly-polar three-ring compounds are
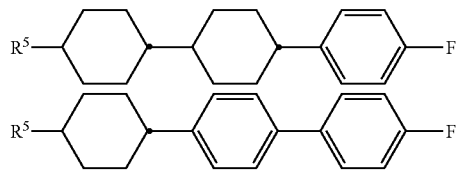
wherein $R^5$ has the meaning given above.
Examplary formulae strongly dielectrically positive three-ring compounds are
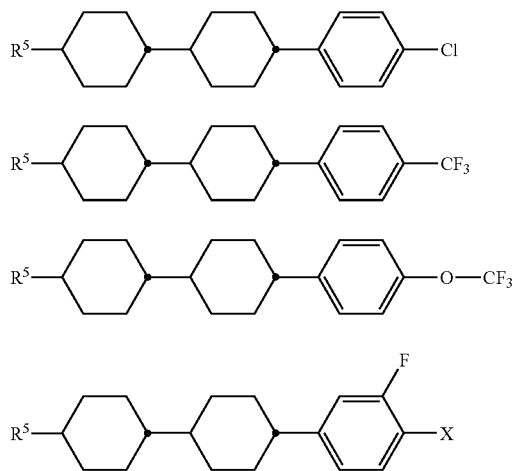
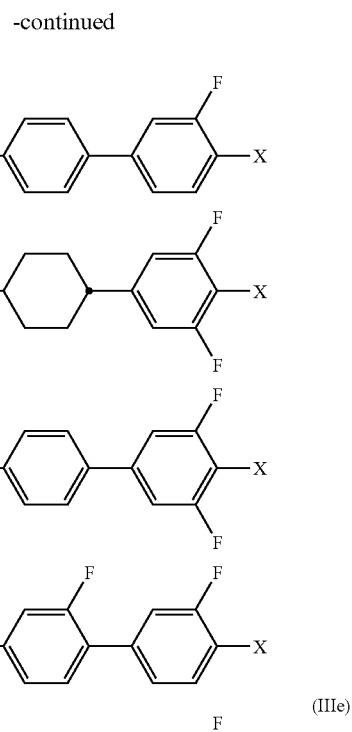
(IIIe)
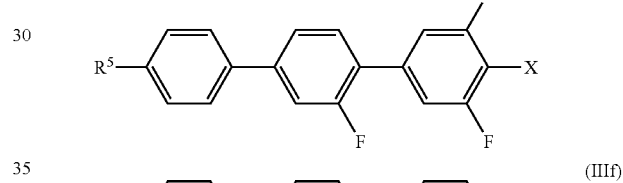
(IIIf)
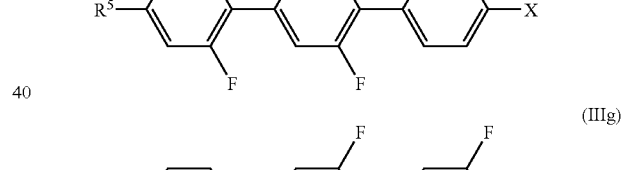
(IIIg)
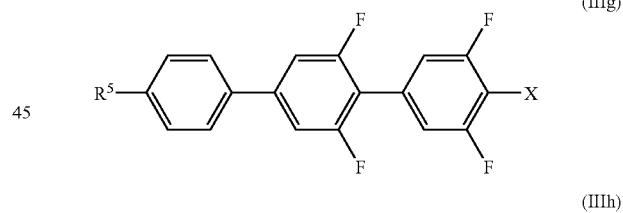
(IIIh)
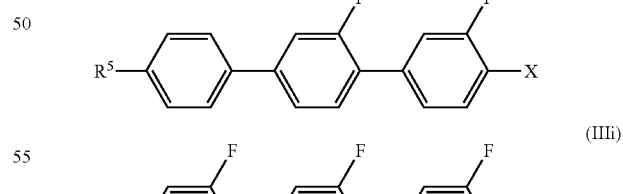
(IIIi)
(IIIj)
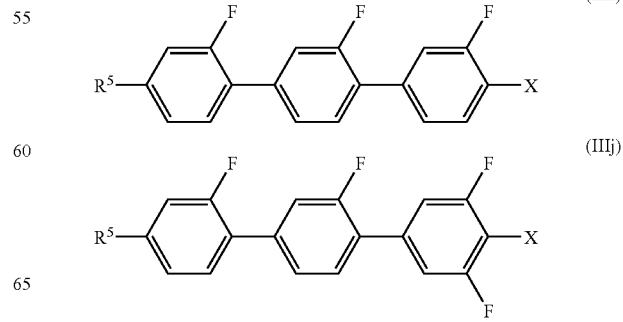

-continued
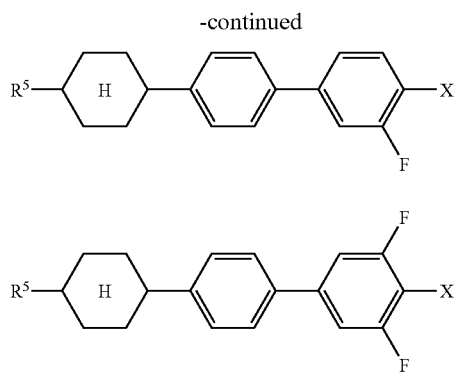
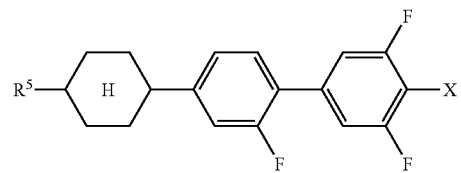
wherein the $R^5$ has the meaning given above and X denotes —F, —Cl, —$OCF_3$, —$OCHF_2$, —$OCH_2F$ or —$CF_3$
The liquid-crystalline medium may also comprise additives. Examples are the following chiral dopants:
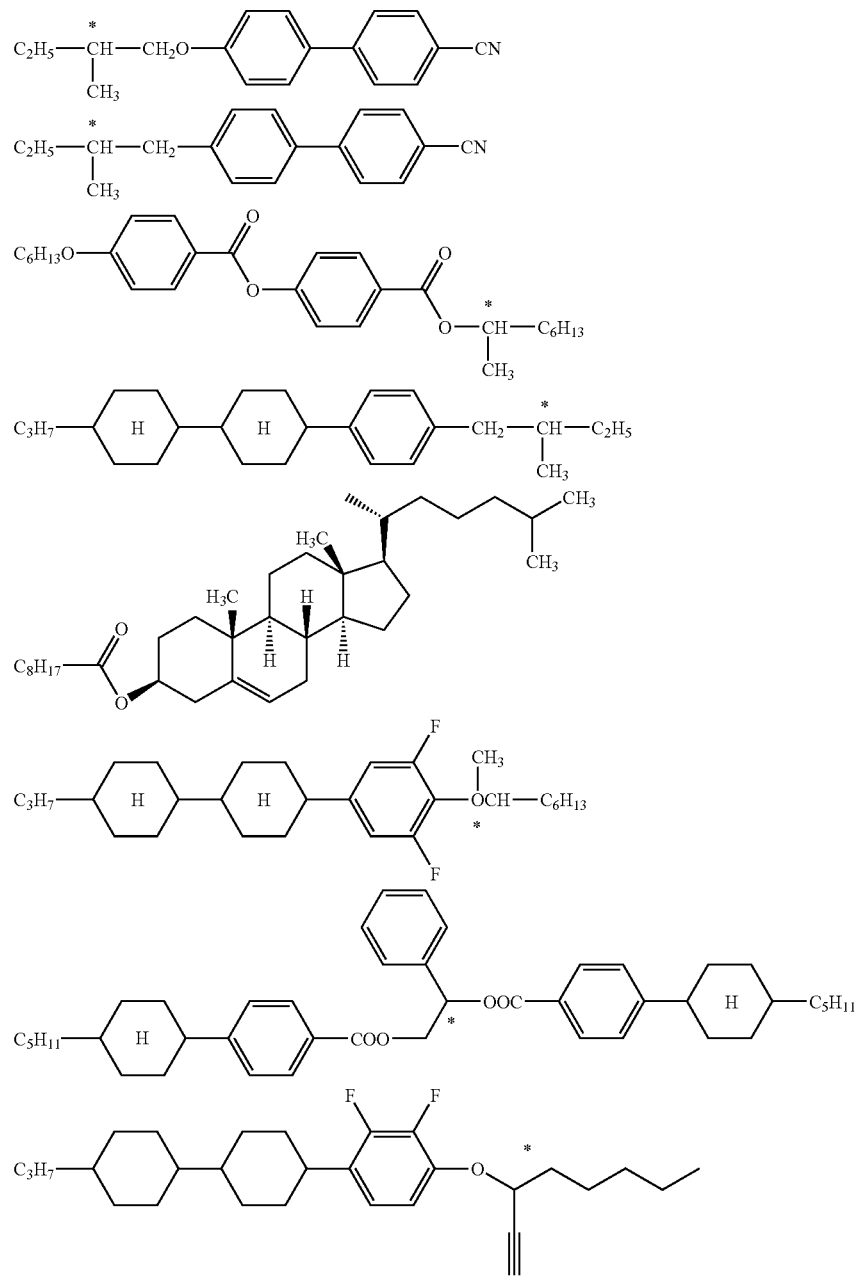

-continued
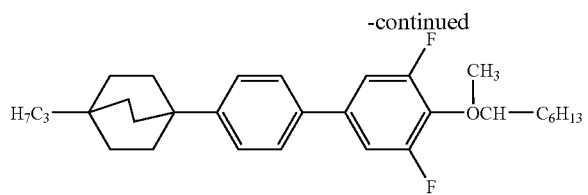
Further suitable additives are the following stabilizers:
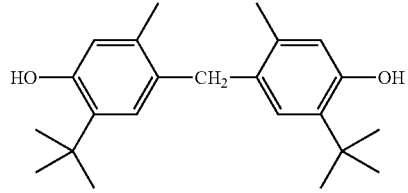
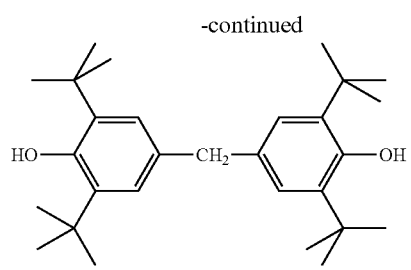
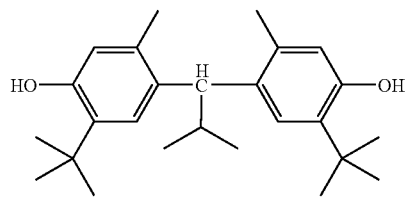
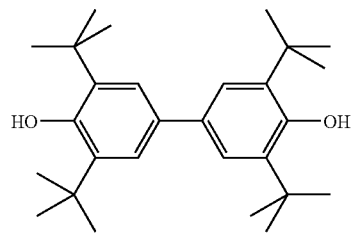
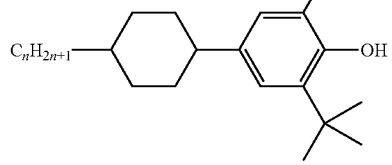
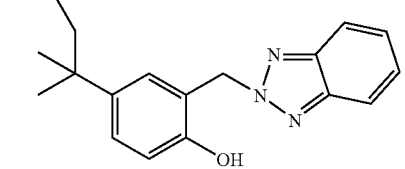
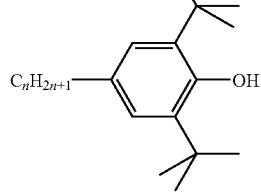
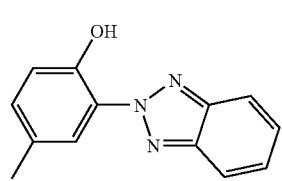
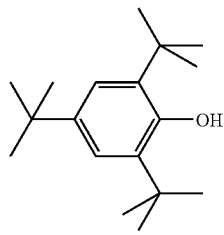
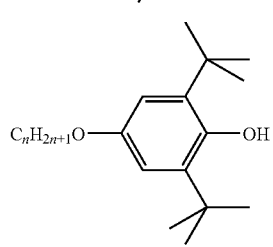
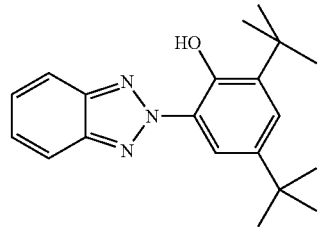

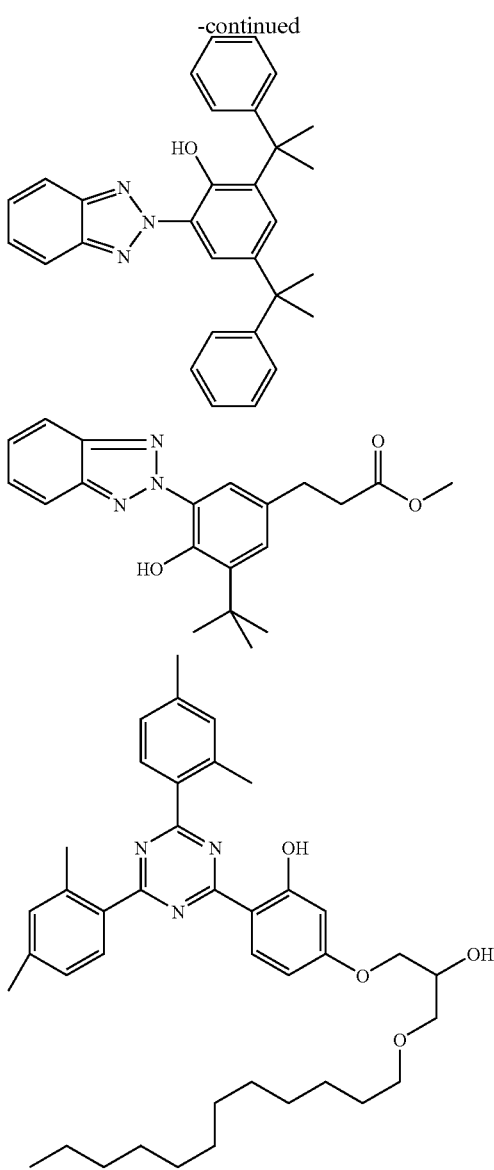

The present invention is also directed to the use of the liquid-crystalline medium which are described above in an electro-optical display element.

The present invention further relates to an electro-optical display element containing a liquid-crystalline medium as claimed in any of the respective claims.

The compounds are prepared by methods known per se, as described in the literature (for example in the standard works, such as Houben-Weyl, Methoden der Organischen Chemie, Georg-Thieme-Verlag, Stuttgart), to be precise under reaction conditions which are known and suitable for said reactions. Use can also be made here of variants which are known per se, but are not mentioned here in greater detail. Furthermore, the compounds of the formulae (I) to (IV) can be prepared as described in the relevant patent literature.

The invention also relates to electro-optical displays, in particular TFT displays, having two plane-parallel outer plates, which, together with a frame, form a cell, integrated non-linear elements for switching individual pixels on the outer plates, and a nematic liquid-crystal mixture of positive dielectric anisotropy which is located in the cell, which contain the liquid-crystalline media according to the invention, and to the use of these media for electro-optical displays.

The liquid-crystal mixtures according to the invention allow a significant extension of the parameter latitude which is available.

The achievable combinations of clearing point, rotational viscosity, optical anisotropy and threshold voltage are superior to current prior art materials.

The liquid-crystal mixtures which can be used in accordance with the invention are prepared in a manner conventional. In general, the desired amount of the components used in a lesser amount is dissolved in the component making up the principal constituent, expediently at elevated temperature. It is also possible to mix solutions of the components in an organic solvent, for example in acetone, chloroform or methanol, and to remove the solvent again after thorough mixing, for example by distillation. It is also possible to prepare the mixtures in other conventional manners, for example by using pre-mixtures, for example homologue mixtures, or using "multi-bottle" systems.

The frequency dependence of the inventive media is small. Preferably the frequency of the inflection point ($v_{Turn}$) at 20° C. is 200 Hz or less, preferably for a medium with a clearing point of 100° C. or more, more preferably this frequency is less than 200 Hz at a temperature of 0° C., preferably for a medium with a clearing point of 80° C. or more.

The dielectric anisotropy of the respective compound is determined from the results of a solution of 10% of the respective individual compound in a nematic host mixture. In case the solubility of the respective compound in the host mixture is less than 10% the concentration is reduced to 5%. The capacities of the test mixtures are determined both in a cell with homeotropic and with homogeneous alignment. The cell gap of both types of cells is approximately 20 µm. The voltage applied is a rectangular wave with a frequency of 1 kHz and a root mean square value typically of 0.5 V to 1.0 V, however, it is always selected to be below the capacitive threshold of the respective test mixture.

For dielectrically positive compounds the mixture ZLI-4792 and for dielectrically neutral, as well as for dielectrically negative compounds, the mixture ZLI-3086, both of Merck KGaA, Germany are used as host mixture, respectively. The dielectric permittivities of the compounds are determined from the change of the respective values of the host mixture upon addition of the compounds of interest. The values are extrapolated to a concentration of the compounds of interest of 100%.

Components having a nematic phase at the measurement temperature of 20° C. are measured as such, all others are treated like compounds.

The term threshold voltage refers in the instant application to the optical threshold and is given for 10% relative contrast ($V_{10}$) and the term saturation voltage refers to the optical saturation and is given for 90% relative contrast ($V_{90}$) both, if not explicitly stated otherwise. The capacitive threshold voltage ($V_0$), also called Freedericksz-threshold ($V_{Fr}$) is only used if explicitly mentioned.

The ranges of parameters given in this application are all including the limiting values, unless explicitly stated otherwise.

Throughout this application, unless explicitly stated otherwise, all concentrations are given in mass percent and relate to the respective complete mixture, all temperatures are given in degrees centigrade (Celsius) and all differences of temperatures in degrees centigrade. All physical properties have been and are determined according to "Merck Liquid Crystals, Physical Properties of Liquid Crystals", Status November 1997, Merck KGaA, Germany and are given for a temperature of 20° C., unless explicitly stated otherwise. The optical anisotropy ($\Delta n$) is determined at a wavelength of 589.3 nm. The dielectric anisotropy ($\Delta \epsilon$) is determined at a frequency of 1 kHz. The threshold voltages, as well as all other electro-optical properties have been determined with test cells prepared at Merck KGaA, Germany. The test cells for the determination of $\Delta \epsilon$ had a cell gap of approximately 20 µm. The electrode was a circular ITO electrode with an area of 1.13 cm$^2$ and a guard ring. The orientation layers were lecithin for homeotropic orientation ($\epsilon \parallel$) and polyimide AL-1054 from Japan Synthetic Rubber for homogeneous orientation ($\epsilon \perp$). The capacities were determined with a frequency response analyser Solatron 1260 using a sine wave with a voltage of 0.3 $V_{rms}$. The light used in the electro-optical measurements was white light. The set up used was commercially available equipment of Otsuka, Japan. The characteriztic voltages have been determined under perpendicular observation. The threshold ($V_{10}$)-mid grey ($V_{50}$)-and saturation ($V_{90}$) voltages have been determined for 10%, 50% and 90% relative contrast, respectively.

The liquid crystal media according to the present invention can contain further additives and chiral dopants in usual concentrations. The total concentration of these further constituents is in the range of 0% to 10%, preferably 0.1% to 6%, based on the total mixture. The concentrations of the individual compounds used each are preferably in the range of 0.1% to 3%. The concentration of these and of similar additives is not taken into consideration for the values and ranges of the concentrations of the liquid crystal components and compounds of the liquid crystal media in this application.

The inventive liquid crystal media according to the present invention consist of several compounds, preferably of 3 to 30, more preferably of 4 to 20 and most preferably of 4 to 16 compounds. These compounds mixed in conventional way. Usually, the required amount of the compound used in the smaller amount is dissolved in the compound used in the greater amount. In case the temperature is above the clearing point of the compound used in the higher concentration, it is particularly easy to observe completion of the process of dissolution. It is, however, also possible to prepare the media by other conventional ways, e.g. using so called pre-mixtures, which can be e.g. homologous or eutectic mixtures of compounds or using so called multi-bottle-systems, the constituents of which are ready to use mixtures themselves.

By addition of suitable additives, the liquid crystal media according to the instant invention can be modified in such a way, that they are usable in all known types of liquid crystal displays, either using the liquid crystal media as such, like TN-, TN-AMD, ECB-AMD, VAN-AMD, IPS and OCB LCDs and in particular in composite systems, like PDLC, NCAP, PN LCDs and especially in ASM-PA LCDs.

The melting point T(C,N), the transition from the smectic (S) to the nematic (N) phase T(S,N) and the clearing point T(N,I) of the liquid crystals are given in degrees centigrade.

In the present application and especially in the following examples, the structures of the liquid crystal compounds are represented by abbreviations also called acronyms. The transformation of the abbreviations into the corresponding structures is straight forward according to the following two tables A and B. All groups $C_nH_{2n+1}$ and $C_mH_{2+1}$ are straight chain alkyl groups with n respectively m C-atoms. The interpretation of table B is self-evident. Table A does only list the abbreviations for the cores of the structures. The individual compounds are denoted by the abbreviation of the core followed by a hyphen and a code specifying the substituents $R^1$, $R^2$, $L^1$ and $L^2$ follows:

| Code for $R^1$, $R^2$, $L^1$, $L^2$ | R1 | R2 | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |
| nN.F.F | $C_nH_{2n+1}$ | CN | F | F |
| nF | $C_nH_{2n+1}$ | F | H | H |
| nF.F | $C_nH_{2n+1}$ | F | H | F |
| nF.F.F | $C_nH_{2n+1}$ | F | F | F |
| nOF | $OC_nH_{2n+1}$ | F | H | H |
| nCl | $C_nH_{2n+1}$ | Cl | H | H |
| nCl.F | $C_nH_{2n+1}$ | Cl | H | F |
| nCl.F.F | $C_nH_{2n+1}$ | Cl | F | F |
| nCF$_3$ | $C_nH_{2n+1}$ | CF$_3$ | H | H |
| nCF$_3$.F | $C_nH_{2n+1}$ | CF$_3$ | H | F |
| nCF$_3$.F.F | $C_nH_{2n+1}$ | CF$_3$ | F | F |
| nOCF$_3$ | $C_nH_{2n+1}$ | OCF$_3$ | H | H |
| nOCF$_3$.F | $C_nH_{2n+1}$ | OCF$_3$ | H | F |
| nOCF$_3$.F.F | $C_nH_{2n+1}$ | OCF$_3$ | F | F |
| nOCF$_2$ | $C_nH_{2n+1}$ | OCHF$_2$ | H | H |
| nOCF$_2$.F | $C_nH_{2n+1}$ | OCHF$_2$ | H | F |
| nOCF$_2$.F.F | $C_nH_{2n+1}$ | OCHF$_2$ | F | F |
| nS | $C_nH_{2n+1}$ | NCS | H | H |
| nS.F | $C_nH_{2n+1}$ | NCS | H | F |
| nS.F.F | $C_nH_{2n+1}$ | NCS | F | F |
| rVsN | $C_rH_{2r+1}$—CH=CH—$C_sH_{2s}$— | CN | H | H |
| rEsN | $C_rH_{2r+1}$—O—$C_sH_{2s}$— | CN | H | H |
| nAm | $C_nH_{2n+1}$ | $COOC_mH_{2m+1}$ | H | H |

TABLE A

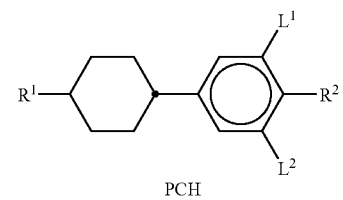

PCH

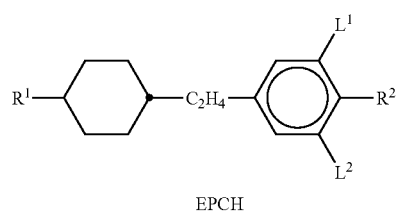

EPCH

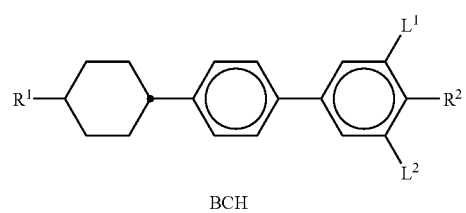

BCH

TABLE A-continued
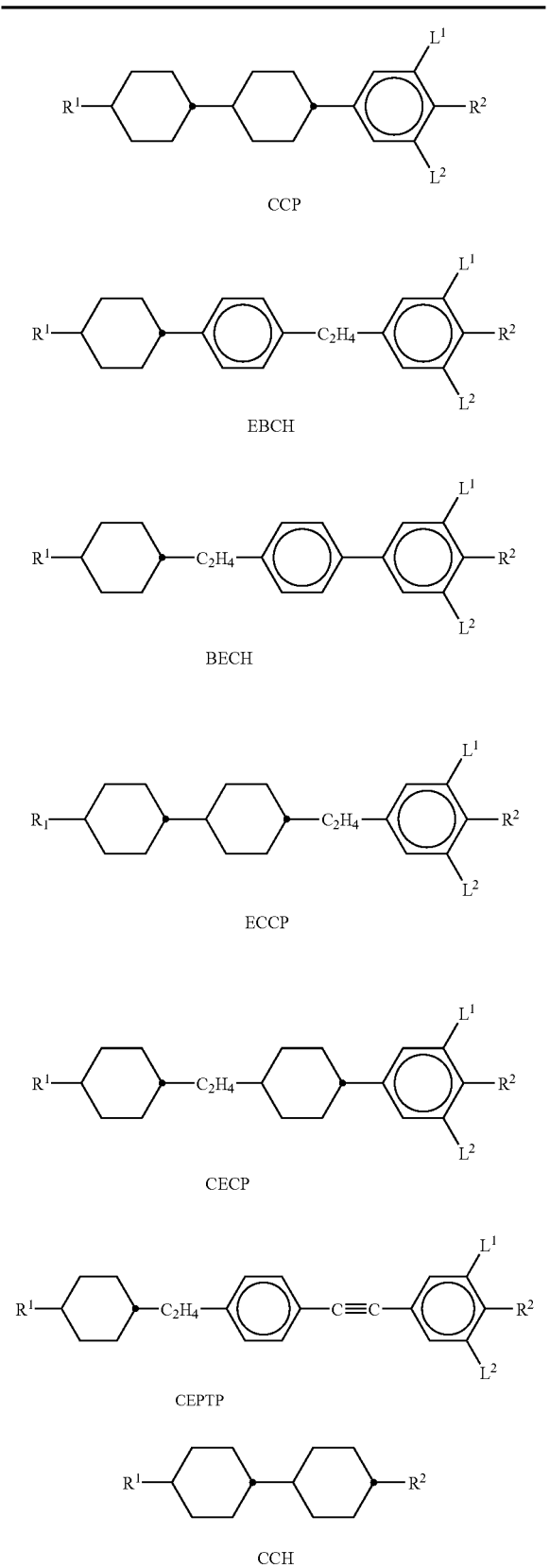
TABLE A-continued
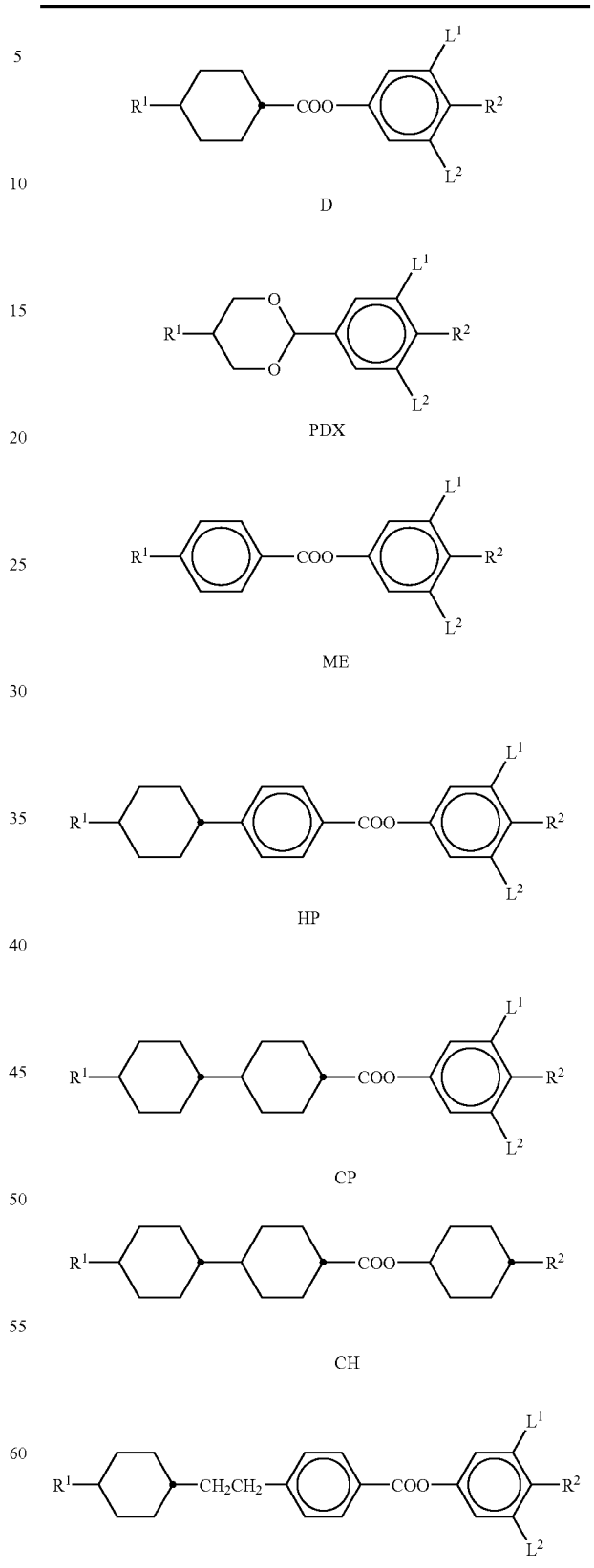

TABLE B
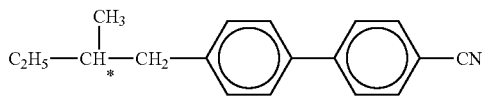
CB15
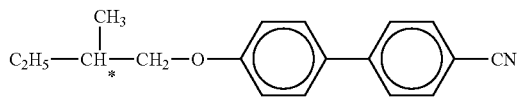
C15
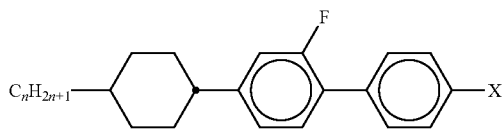
CGP-n-X (X = F, Cl, "OT" = OCF$_3$, "OD" = OCF$_2$H)
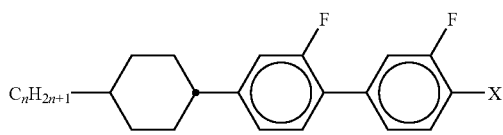
CGG-n.X (X = F, Cl, "OT" = OCF$_3$, "OD" = OCF$_2$H)
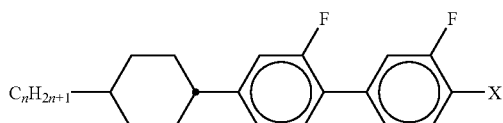
CGU-n-X (X = F, Cl, "OT" = OCF$_3$, "OD" = OCF$_2$H)
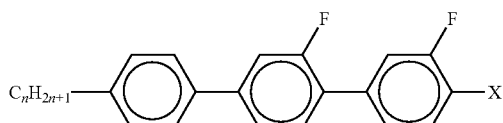
PGU-n-X (X = F, Cl, "OT" = OCF$_3$, "OD" = OCF$_2$H)
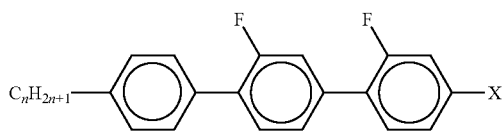
PGIGI-n-X (X = F, Cl, "OT" = OCF$_3$, "OD" = OCF$_2$H)
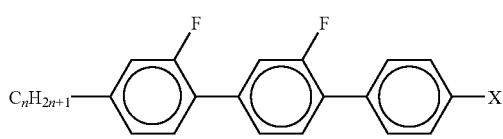
GGP-n-X (X = F, Cl, "OT" = OCF$_3$, "OD" = OCF$_2$H)

TABLE B-continued
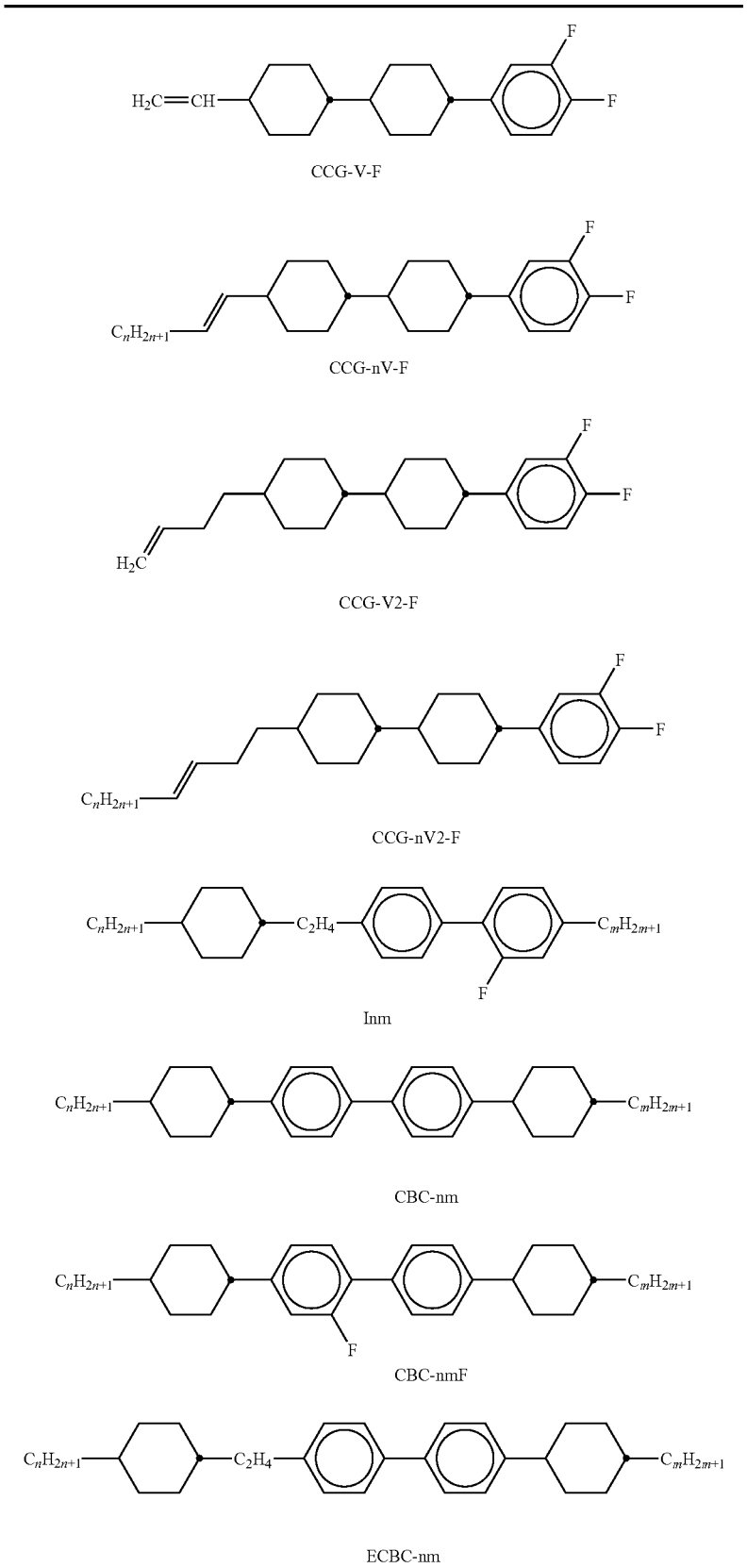

TABLE B-continued
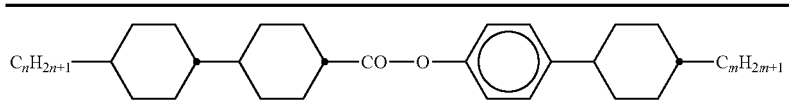
CCPC-nm
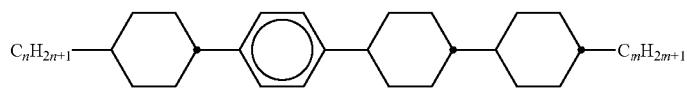
CPCC-n-m
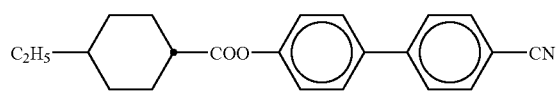
CHE
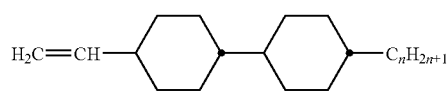
CC-n-V
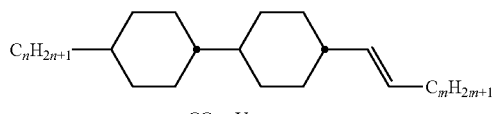
CC-n-Vm
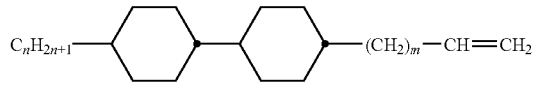
CC-n-mV
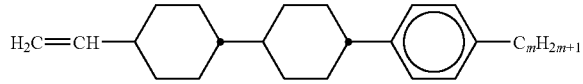
CCP-V-m
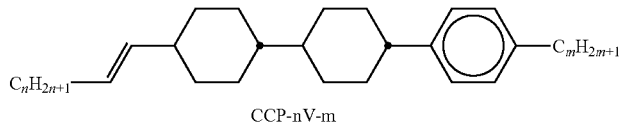
CCP-nV-m
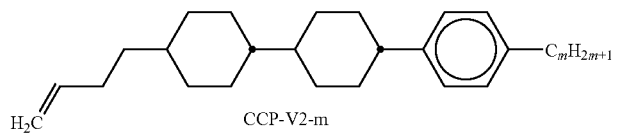
CCP-V2-m
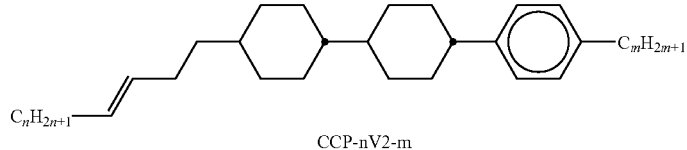
CCP-nV2-m TABLE B-continued
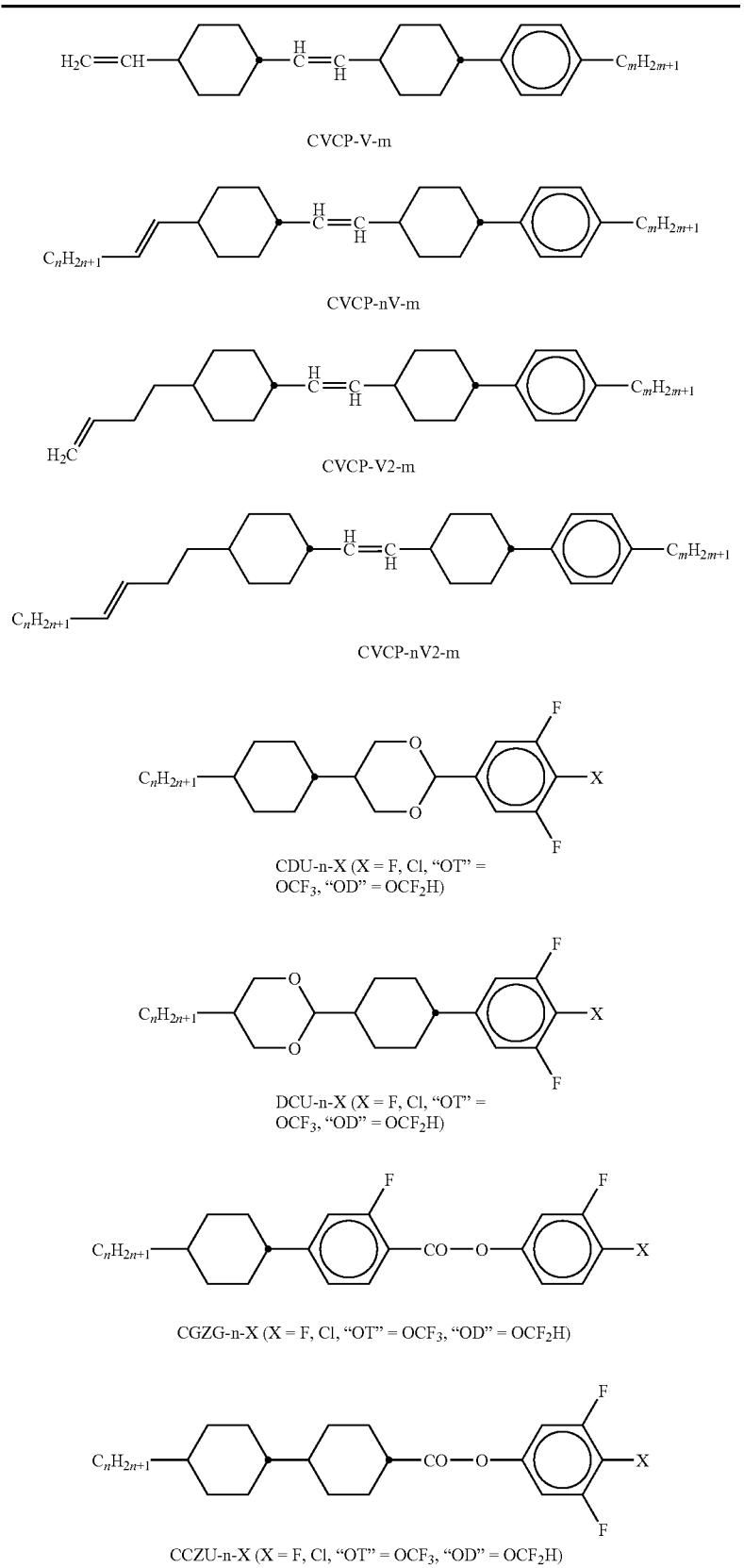

TABLE B-continued
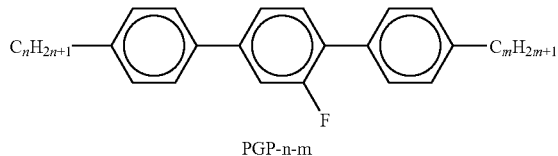
PGP-n-m
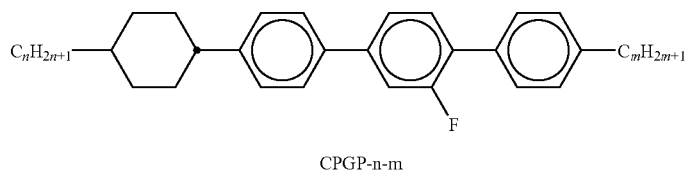
CPGP-n-m
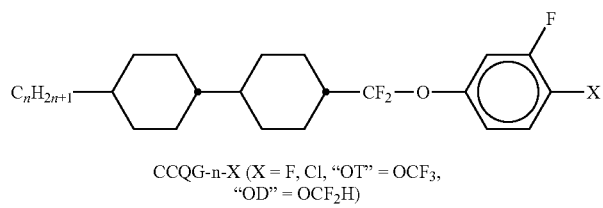
CCQG-n-X (X = F, Cl, "OT" = OCF$_3$, "OD" = OCF$_2$H)
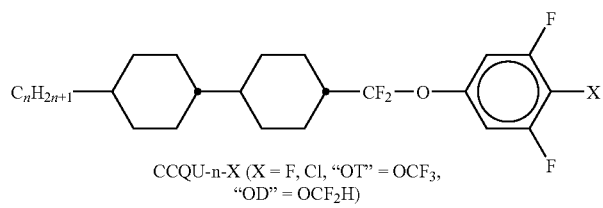
CCQU-n-X (X = F, Cl, "OT" = OCF$_3$, "OD" = OCF$_2$H)
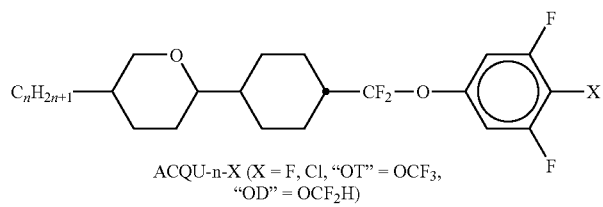
ACQU-n-X (X = F, Cl, "OT" = OCF$_3$, "OD" = OCF$_2$H)
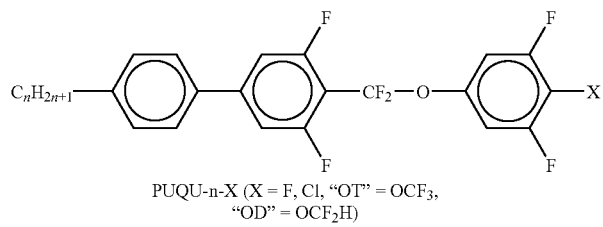
PUQU-n-X (X = F, Cl, "OT" = OCF$_3$, "OD" = OCF$_2$H)
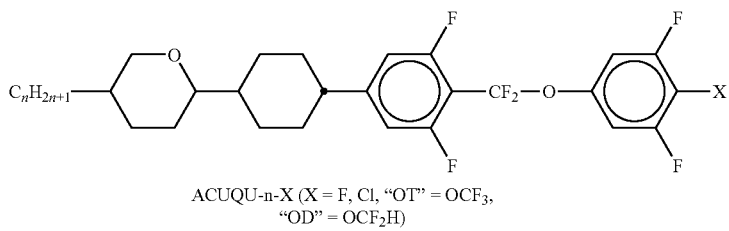
ACUQU-n-X (X = F, Cl, "OT" = OCF$_3$, "OD" = OCF$_2$H)

TABLE B-continued
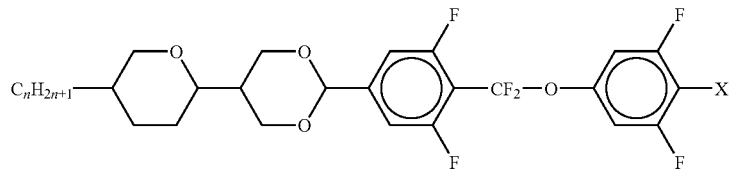
ADUQU-n-X (X = F, Cl, "OT" = OCF$_3$,
"OD" = OCF$_2$H)
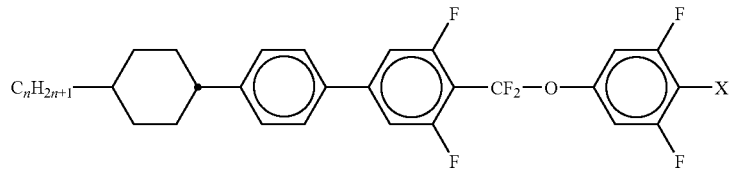
CPUQU-n-X (X = F, Cl, "OT" = OCF$_3$,
"OD" = OCF$_2$H)
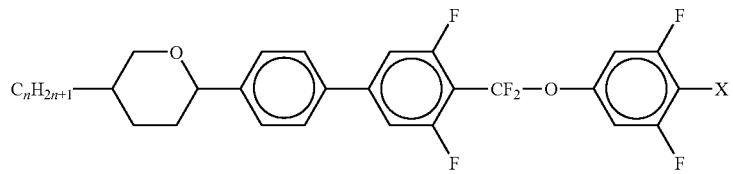
APUQU-n-X (X = F, Cl, "OT" = OCF$_3$,
"OD" = OCF$_2$H)
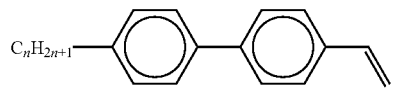
PP-n-V
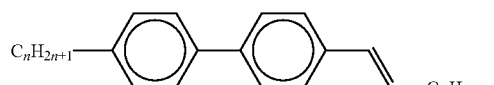
PP-n-Vm
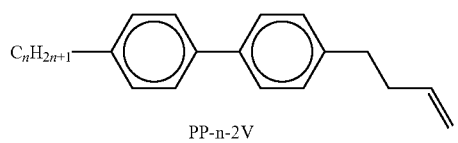
PP-n-2V
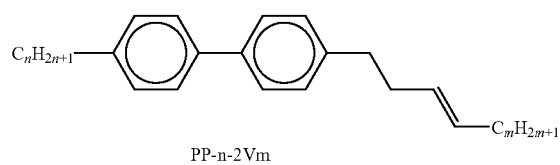
PP-n-2Vm
PP-n(O)-X (X = F, Cl, "OT" = OCF$_3$,
"OD" = OCF$_2$H, "OMT" = OCFHCF$_3$)

TABLE B-continued

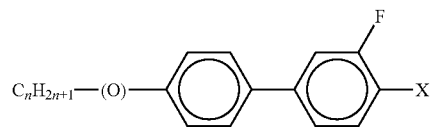

PG-n(O)-X (X = F, Cl, "OT" = OCF$_3$,
"OD" = OCF$_2$H, "OMT" = OCFHCF$_3$)

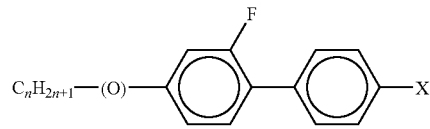

GP-n(O)-X (X = F, Cl, "OT" = OCF$_3$,
"OD" = OCF$_2$H, "OMT" = OCFHCF$_3$)

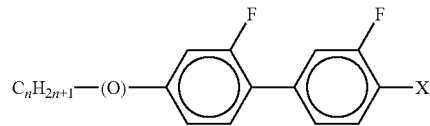

GG-n(O)-X (X = F, Cl, "OT" = OCF$_3$,
"OD" = OCF$_2$H, "OMT" = OCFHCF$_3$)

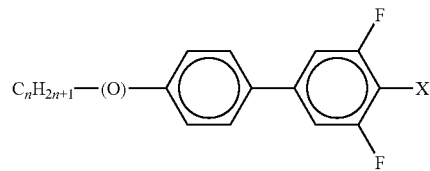

PU-nO-X (X = F, Cl, "OT" = OCF$_3$,
"OD" = OCF$_2$H, "OMT" = OCFHCF$_3$)

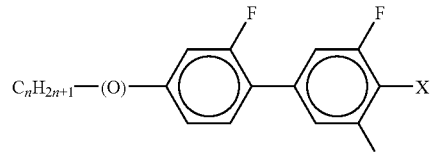

GU-n(O)-X (X = F, Cl, "OT" = OCF$_3$,
"OD" = OCF$_2$H, "OMT" = OCFHCF$_3$)

The liquid crystal media according to the instant invention contain preferably
- seven or more, preferably eight or more compounds, preferably of different formulae, selected from the group of compounds of tables A and B and/or
- one or more, more preferably two or more, preferably three or more compounds, preferably of different formulae, selected from the group of compounds of table A and/or
- three or more, more preferably four or more compounds, more preferably five or more compounds, preferably of different formulae, selected from the group of compounds of table B.

The entire disclosure[s] of all applications, patents and publications, cited herein and of corresponding European Patent Application No. 05016870.7 filed Aug. 3, 2005 and 05027841.5 filed Dec. 20, 2005 are incorporated by reference herein.

EXAMPLES

The examples given in the following are illustrating the present invention without limiting it in any way.

However, the physical properties compositions illustrate to the expert, which properties can be achieved and in which ranges they can be modified. Especially the combination of the various properties, which can be preferably achieved, is thus well defined for the expert.

Comparative Example 1 and Example 1

Liquid crystal mixtures are realized with the respective compositions and properties given in the following tables.

Comparative example 1
Composition Compound

| No. | Abbreviation | Conc./% |
|---|---|---|
| 1 | CCG-V-F | 20.0 |
| 2 | BCH-2F.F | 10.0 |
| 3 | BCH-3F.F | 10.0 |
| 4 | BCH-3F.F.F | 12.0 |
| 5 | BCH-5F.F.F | 6.0 |
| 6 | PCH-53 | 19.0 |
| 7 | PCH-3O1 | 12.5 |
| 8 | CCP-V-1 | 3.5 |
| 9 | BCH-32 | 7.0 |
| Σ | | 100.0 |

Physical Properties

| | |
|---|---|
| $T(N, I) =$ | 58.0° C. |
| $n_e$ (20° C., 589.3 nm) = | 1.6035 |
| $\Delta n$ (20° C., 589.3 nm) = | 0.1031 |
| $\epsilon_\parallel$ (20° C., 1 kHz) = | 7.7 |
| $\Delta\epsilon$ (20° C., 1 kHz) = | 4.3 |

EXAMPLE 1
Composition Compound

| No. | Abbreviation | Conc./% |
|---|---|---|
| 1 | PG-1O-OT | 10.0 |
| 2 | PG-2O-OT | 10.0 |
| 3 | GP-1O-OT | 11.0 |
| 4 | GP-2O-OT | 10.0 |
| 5 | CCH-3O1 | 10.0 |
| 6 | CC-5-V | 15.0 |
| 7 | CCP-V-1 | 16.0 |
| 8 | CCP-V2-1 | 11.0 |
| 9 | BCH-32 | 2.0 |
| 10 | CBC-33 | 5.0 |
| Σ | | 100.0 |

Physical Properties

| | |
|---|---|
| $T(N, I) =$ | 57.0° C. |
| $n_e$ (20° C., 589.3 nm) = | 1.5890 |
| $\Delta n$ (20° C., 589.3 nm) = | 0.1030 |
| $\epsilon_\parallel$ (20° C., 1 kHz) = | 7.9 |
| $\Delta\epsilon$ (20° C., 1 kHz) = | 4.0 |

The mixtures of the comparative example 1 and of the example 1 have been investigated with respect to the frequency dependence of their dielectric anisotropy in the range from 1 kHz to 1,000 kHz over a temperature range from −20° C. to 20° C. The results are given in the following table.

TABLE 1
Properties of comparative example 1 and of example 1

| T/° C. | C.E. 1 $\Delta\epsilon$(1 kHz) | 1 | C.E. 1 $v_{Turn}$/kHz | 1 |
|---|---|---|---|---|
| −20 | 5.9 | 5.5 | 28 | 200 |
| −10 | 5.5 | 5.1 | 80 | 500 |
| 0 | 5.0 | 4.8 | 200 | 1,000 |
| 10 | 4.6 | 4.3 | 500 | >1,000 |
| 20 | 4.2 | 4.0 | 900 | >1,000 |

Remarks: $v_{Turn}$ = frequency of inflection point

Comparative Example 2

A liquid crystal mixture is realized with the composition and properties given in the following table.

Composition Compound

| No. | Abbreviation | Conc./% |
|---|---|---|
| 1 | BCH-3F.F.F | 11.0 |
| 2 | BCH-2F.F | 3.0 |
| 3 | PGU-2-F | 8.0 |
| 4 | PGU-3-F | 8.0 |
| 5 | CGU-2-F | 8.0 |
| 6 | CCP-2F.F.F | 8.0 |
| 7 | CCP-2OCF3 | 5.0 |
| 8 | CCP-3OCF3 | 5.0 |
| 9 | CCP-4OCF3 | 5.0 |
| 10 | CCP-5OCF3 | 3.0 |
| 11 | CCP-V-1 | 12.0 |
| 12 | CCP-V2-1 | 11.0 |
| 13 | CC-5-V | 10.0 |
| 14 | CBC-33F | 3.0 |
| Σ | | 100.0 |

Physical Properties

| | |
|---|---|
| $T(N, I) =$ | 99.0° C. |
| $T(S, N) <$ | −30° C. |
| $n_e$ (20° C., 589.3 nm) = | 1.6110 |
| $\Delta n$ (20° C., 589.3 nm) = | 0.1185 |
| $\epsilon_\parallel$ (20° C., 1 kHz) = | 12.2 |
| $\Delta\epsilon$ (20° C., 1 kHz) = | 8.7 |
| $\gamma_1$ (20° C.) = | 134 mPa·s |

Example 2

A liquid crystal mixture is realized with the composition and properties given in the following table.

Composition Compound

| No. | Abbreviation | Conc./% |
|---|---|---|
| 1 | PG-1O-OT | 8.0 |
| 2 | PG-2O-OT | 8.0 |
| 3 | GP-2O-OT | 9.0 |
| 4 | PU-1-OMT | 13.0 |
| 5 | CGU-2-F | 6.0 |
| 6 | CGU-3-F | 6.0 |
| 7 | CGU-5-F | 7.0 |
| 8 | CC-5-V | 4.0 |
| 9 | CCP-V-1 | 4.0 |
| 10 | CCP-V2-1 | 7.5 |
| 11 | CCPC-33 | 5.5 |
| 12 | CCPC-34 | 5.5 |
| 13 | CCPC-35 | 5.5 |
| 14 | CBC-33 | 3.0 |
| 15 | CBC-53 | 4.0 |
| 16 | CBC-33F | 4.0 |
| Σ | | 100.0 |

Physical Properties

| | |
|---|---|
| $T(N, I) =$ | 98.0° C. |
| $T(S, N) <$ | −20° C. |
| $n_e$ (20° C., 589.3 nm) = | 1.6138 |
| $\Delta n$ (20° C., 589.3 nm) = | 0.1280 |
| $\epsilon_\parallel$ (20° C., 1 kHz) = | 13.0 |
| $\Delta\epsilon$ (20° C., 1 kHz) = | 8.5 |
| $\gamma_1$ (20° C.) = | 225 mPa·s |

Example 3

A liquid crystal mixture is realized with the composition and properties given in the following table.

| Composition Compound | | |
|---|---|---|
| No. | Abbreviation | Conc./% |
| 1 | PG-1O-OT | 9.0 |
| 2 | PG-2O-OT | 7.0 |
| 3 | GP-2O-OT | 9.0 |
| 4 | PU-1-OMT | 13.0 |
| 5 | CGU-2-F | 5.0 |
| 6 | CGU-3-F | 5.0 |
| 7 | CGU-5-F | 5.0 |
| 8 | CC-5-V | 5.0 |
| 9 | CCP-V-1 | 5.0 |
| 10 | CCP-V2-1 | 7.5 |
| 11 | CCPC-33 | 5.5 |
| 12 | CCPC-34 | 5.5 |
| 13 | CCPC-35 | 5.5 |
| 14 | CBC-33 | 3.0 |
| 15 | CBC-53 | 4.0 |
| 16 | CBC-33F | 4.0 |
| Σ | | 100.0 |

| Physical Properties | |
|---|---|
| T(N, I) = | 101.0° C. |
| T(S, N) < | −20° C. |
| $n_e$ (20° C., 589.3 nm) = | 1.6108 |
| Δn (20° C., 589.3 nm) = | 0.1262 |
| $\epsilon_\parallel$ (20° C., 1 kHz) = | 12.0 |
| Δε (20° C., 1 kHz) = | 7.8 |
| $\gamma_1$ (20° C.) = | 198 mPa·s |

Example 4

A liquid crystal mixture is realized with the composition and properties given in the following table.

| Composition Compound | | |
|---|---|---|
| No. | Abbreviation | Conc./% |
| 1 | PG-1O-OT | 9.0 |
| 2 | PG-2O-OT | 8.0 |
| 3 | GP-2O-OT | 8.0 |
| 4 | GU-1-OT | 12.0 |
| 5 | CGU-2-F | 5.0 |
| 6 | CGU-3-F | 5.0 |
| 7 | CGU-5-F | 5.0 |
| 8 | CCG-V-F | 4.5 |
| 9 | CCP-V-1 | 9.0 |
| 10 | CCP-V2-1 | 7.0 |
| 11 | CCPC-33 | 5.5 |
| 12 | CCPC-34 | 5.5 |
| 13 | CCPC-35 | 5.5 |
| 14 | CBC-33 | 3.0 |
| 15 | CBC-53 | 4.0 |
| 16 | CBC-33F | 4.0 |
| Σ | | 100.0 |

| Physical Properties | |
|---|---|
| T(N, I) = | 102.0° C. |
| T(S, N) < | −20° C. |
| $n_e$ (20° C., 589.3 nm) = | 1.6146 |
| Δn (20° C., 589.3 nm) = | 0.1256 |
| $\epsilon_\parallel$ (20° C., 1 kHz) = | 12.5 |
| Δε (20° C., 1 kHz) = | 8.0 |
| $\gamma_1$ (20° C.) = | 196 mPa·s |

Example 5

A liquid crystal mixture is realized with the composition and properties given in the following table.

| Composition Compound | | |
|---|---|---|
| No. | Abbreviation | Conc./% |
| 1 | PG-1O-OT | 12.0 |
| 2 | PG-2O-OT | 12.0 |
| 3 | PG-1-CL | 4.0 |
| 4 | PG-2O-CL | 11.0 |
| 5 | GP-2O-OT | 9.0 |
| 6 | GP-1O-CL | 7.0 |
| 7 | CGU-2-F | 6.0 |
| 8 | CGU-3-F | 5.0 |
| 9 | CGU-5-F | 6.0 |
| 10 | CCP-V-1 | 5.5 |
| 11 | CCPC-33 | 5.5 |
| 12 | CCPC-34 | 5.5 |
| 13 | CCPC-35 | 5.5 |
| 14 | CBC-33 | 5.0 |
| 15 | CBC-53 | 5.0 |
| 16 | CBC-33F | 5.0 |
| Σ | | 100.0 |

| Physical Properties | |
|---|---|
| T(N, I) = | 102.0 ° C. |
| $n_e$ (20° C., 589.3 nm) = | 1.6531 |
| Δn (20° C., 589.3 nm) = | 0.1532 |
| $\epsilon_\parallel$ (20° C., 1 kHz) = | 12.8 |
| Δε (20° C., 1 kHz) = | 8.1 |

The mixtures of the comparative example 2 and of the examples 2 to 5 have been investigated with respect to the frequency dependence of their dielectric anisotropy in the frequency range from 1 kHz to 1,000 kHz at a temperature of 10° C. The results are given in the following table.

TABLE 2

| Properties of examples at 10° C. | | | | | |
|---|---|---|---|---|---|
| | | | Example # | | |
| | C.E. 2 | 2 | 3 | 4 | 5 |
| ν/kHz | | | Δε' | | |
| 1 | 1.00 | 1.00 | 1.00 | 1.00 | 1.00 |
| 10 | 0.98 | 0.99 | 0.99 | 0.99 | 0.99 |
| 100 | 0.77 | 0.90 | 0.87 | 0.90 | 0.87 |
| 200 | 0.54 | 0.76 | 0.71 | 0.76 | 0.71 |
| 400 | 0.24 | 0.52 | 0.45 | 0.55 | 0.45 |
| 1,000 | 0.01 | 0.14 | 0.12 | 0.23 | 0.11 |
| $\nu_{Turn}$/kHz | 220 | 350 | 450 | 450 | 350 |

Example 6

A liquid crystal mixture is realized with the composition and properties given in the following table.

| Composition Compound | | |
|---|---|---|
| No. | Abbreviation | Conc./% |
| 1 | GP-2-CL | 7.0 |
| 2 | PUQU-3-F | 18.0 |
| 3 | ACQU-2-F | 8.0 |
| 4 | BCH-2F.F.F | 20.0 |
| 5 | BCH-3F.F.F | 15.0 |
| 6 | CCP-V2-1 | 4.0 |
| 7 | CPGP-5-2 | 14.0 |
| 8 | CPGP-5-3 | 14.0 |
| Σ | | 100.0 |
| Physical Properties | | |
| T(N, I) = | | 102.0° C. |
| $n_e$ (20° C., 589.3 nm) = | | 1.6681 |
| Δn (20° C., 589.3 nm) = | | 0.1621 |
| $\epsilon_\parallel$ (20° C., 1 kHz) = | | 16.5 |
| Δε (20° C., 1 kHz) = | | 11.9 |
| $k_1$ = | | 12.1 pN |
| $k_3/k_1$ = | | 1.108 |
| $V_0$(20° C.) = | | 1.07 V |

Example 7

A liquid crystal mixture is realized with the composition and properties given in the following table.

| Composition Compound | | |
|---|---|---|
| No. | Abbreviation | Conc./% |
| 1 | GP-2-CL | 10.0 |
| 2 | PUQU-3-F | 25.0 |
| 3 | BCH-2F.F.F | 17.0 |
| 4 | CCP-2F.F.F | 10.0 |
| 5 | CPGP-5-2 | 14.0 |
| 6 | CPGP-5-3 | 14.0 |
| 7 | CCP-V2-1 | 10.0 |
| Σ | | 100.00 |
| Physical Properties | | |
| T(N, I) = | | 101.0° C. |
| $n_e$ (20° C., 589.3 nm) = | | 1.6681 |
| Δn (20° C., 589.3 nm) = | | 0.1621 |
| $\epsilon_\parallel$ (20° C., 1 kHz) = | | 16.5 |
| Δε (20° C., 1 kHz) = | | 11.9 |
| $k_1$(20° C.) = | | 12.6 pN |
| $k_3/k_1$(20° C.) = | | 1.05 |
| $\gamma_1$ (20° C.) = | | 219 mPa·s |
| $V_0$ = | | 1.06 V |

Example 8

A liquid crystal mixture is realized with the composition and properties given in the following table.

| Composition Compound | | |
|---|---|---|
| No. | Abbreviation | Conc./% |
| 1 | GP-2-CL | 10.0 |
| 2 | PUQU-3-F | 25.0 |

-continued

| Composition Compound | | |
|---|---|---|
| 3 | CGU-2-F | 10.0 |
| 4 | CCP-2F.F.F | 7.0 |
| 5 | BCH-3F.F.F | 10.0 |
| 6 | CPGP-5-2 | 14.0 |
| 7 | CPGP-5-3 | 14.0 |
| 8 | CCP-V2-1 | 10.0 |
| Σ | | 100.0 |
| Physical Properties | | |
| T(N, I) = | | 100.0° C. |
| $n_e$ (20° C., 589.3 nm) = | | 1.6683 |
| Δn (20° C., 589.3 nm) = | | 0.1618 |

Example 9

A liquid crystal mixture is realized with the composition and properties given in the following table.

| Composition Compound | | |
|---|---|---|
| No. | Abbreviation | Conc./% |
| 1 | GP-2-CL | 5.0 |
| 2 | CP-3-CL | 5.0 |
| 3 | PUQU-3-F | 25.0 |
| 4 | CGU-2-F | 10.0 |
| 5 | CCP-2F.F.F | 5.0 |
| 6 | BCH-3F.F.F | 13.0 |
| 7 | CPGP-5-2 | 14.0 |
| 8 | CPGP-5-3 | 14.0 |
| 9 | CCP-V2-1 | 9.0 |
| Σ | | 100.0 |
| Physical Properties | | |
| T(N, I) = | | 103.0° C. |
| $n_e$ (20° C., 589.3 nm) = | | 1.6656 |
| Δn (20° C., 589.3 nm) = | | 0.1603 |
| $\epsilon_\parallel$ (20° C., 1 kHz) = | | 17.3 |
| Δε (20° C., 1 kHz) = | | 12.9 |
| $k_1$(20° C.) = | | 11.9 pN |
| $k_3/k_1$(20° C.) = | | 1.05 |
| $V_{20}$ | | 1.02 V |

Remarks:

$\Delta\epsilon' = \Delta\epsilon(\omega/\nu)/\Delta\epsilon(1\ kHz)$ at 10° C.

$\nu_{Turn}$=frequency of inflection point (approx. at $\Delta\epsilon'=0.50$)

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A liquid-crystalline medium having a nematic phase wherein the liquid-crystalline medium has a dielectric relaxation frequency of more than 200 kHz at a temperature of 0°C., and wherein the liquid crystalline medium comprises at least one strongly polar two-ring substance selected from the group of compounds of the formula (Ia) and additionally optionally comprises one or more strongly polar two-ring substances of the formula (Ib):

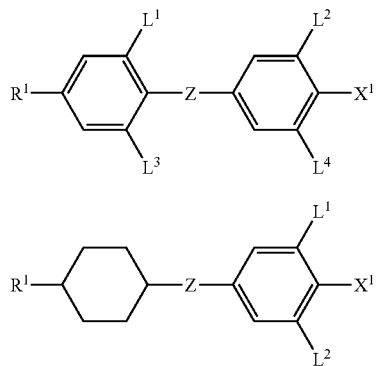

in which: —L$^1$, L$^2$, L$^3$ and L$^4$ each denote, independently from one another, hydrogen or fluorine, provided that at least one of L$^1$, L$^2$, L$^3$ and L$^4$ is fluorine:
—R$^1$ denotes: hydrogen, halogen, an alkyl or alkoxy group with 1 to 7 carbon atom(s), or an alkenyl, alkenyloxy, alkinyl or alkinoxy group with 1 to 7 carbon atoms, wherein for all mentioned groups of R$^{1,}$ one or more —CH$_2$— groups are optionally replaced by —O—, >C=O or —S— with the proviso that no two oxygen atoms are adjacent and wherein the R$^1$ mentioned groups are also optionally substituted by halogen:
—X$^1$ denotes: halogen, a fluorinated alkyl or alkoxy group with 1 to 5 carbon atom(s), a fluorinated alkenyl, alkenyloxy or oxyalkyl group with 2 to 4 carbon atom(s), —OCF$_3$, —OCHFCF$_3$ or —SF$_5$; and
—Z denotes: a single bond, —CF$_2$O—, —COO— or OCF$_2$—, —CH$_2$CH$_2$—, —CH=CH—, —C≡C—, —OCO—, —CH$_2$O—, —(CH$_2$)$_4$—, —CF=CF—, —CH=CF— or —CF=CH—.

2. The liquid-crystalline medium as claimed in claim 1, wherein the liquid-crystalline medium has a clearing point of 70° C. or more.

3. The liquid-crystalline medium as claimed in claim 1, wherein the nematic phase temperature of the liquid crystalline medium extends at least over a temperature range from −20° C. or less to 70° C.

4. The liquid-crystalline medium as claimed in claim 1, wherein, in formula (Ia), at most three of L$^1$, L$^2$, L$^3$ and L$^4$ are F at the same time.

5. The liquid-crystalline medium as claimed in claim 1, wherein the liquid crystalline medium has an amount of said strongly polar two-ring substances of at least 5%.

6. The liquid-crystalline medium as claimed in claim 1, wherein said strongly polar two-ring substances have a dielectric anisotropy, Δ∈, of at least 4.0.

7. The liquid-crystalline medium as claimed in claim 1, wherein the liquid crystalline medium further comprises at least one neutral two ring substance of the formula (II):

$$R^2—A^a—Z^2—A^b—R^3 \quad (II)$$

in which
R$^2$ denotes an alkyl radical having 1 to 15 carbon atoms,
A$^a$ and A$^b$ denote, independently of each other,

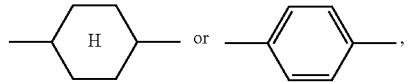

Z$^2$ denotes a single bond or —CH$_2$—CH$_2$—, and
R$^3$ denotes an alkyl, alkoxy or alkenyl radical having 1 to 15 carbon atoms or 2 to 15 carbon atoms, respectively, in which one or more —CH$_2$-groups are optionally replaced by —O— such a way that oxygen atoms are not adjacent, or fluorine.

8. The liquid-crystalline medium as claimed in claim 7, wherein the liquid-crystalline medium has an amount of said neutral two-ring substances of the formula (II) of 10% or more.

9. A liquid-crystalline medium as claimed in claim 1, wherein the liquid-crystalline medium further comprises at least one three-ring substance of the formula (III)

$$R^4—A^c—Z^3—A^d—Z^4—A^e—Y^1 \quad (III)$$

in which
A$^c$, A$^d$ and A$^e$ denote, independently from one another,

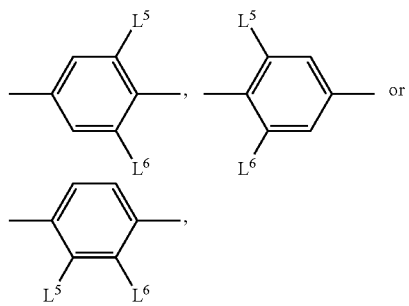

in which
L$^5$ and L$^6$ denote, independently from one another, hydrogen or fluorine,
and
A$^c$ and A$^d$ may alternatively additionally denote

Z$^3$, and Z$^4$ denote, independently from one another, a single bond, —CH$_2$—CH$_2$— or —COO—,
R$^4$ and Y$^1$ denote an alkyl, alkoxy or alkenyl radical with 1 to 7 carbon atom(s) or 2 to 7 carbon atoms, respectively, in which one or more —CH$_2$-groups are optionally replaced by —O— such a way that oxygen atoms are not adjacent, and
Y$^1$ may additionally denote —F, —Cl, —OCF$_3$, —OCHF$_2$, —OCH$_2$F or —CF$_3$.

10. A liquid-crystalline medium as claimed in claim 7, wherein the liquid-crystalline medium further comprises at least one three-ring substance of the formula (III)

$$R^4—A^c—Z^3—A^d—Z^4—A^e—Y^1 \quad (III)$$

in which
A$^c$, A$^d$ and A$^e$ denote, independently from one another,

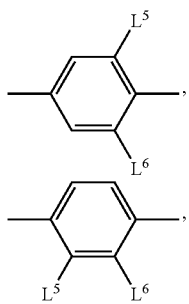 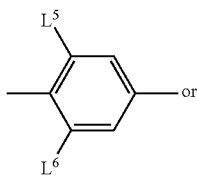

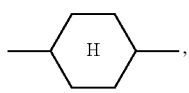

in which
L⁵ and L⁶ denote, independently from one another, hydrogen or fluorine,
and
$A^c$ and $A^d$ may alternatively additionally denote $Z^3, Z^4$ denote, independently from one another, a single bond, —CH₂—CH₂— or —COO—, $R^4$ and $Y^1$ denote an alkyl, alkoxy or alkenyl radical with 1 to 7 carbon atom(s) or 2 to 7 carbon atoms, respectively, in which one or more —CH₂-groups are optionally replaced by —O— such a way that oxygen atoms are not adjacent, and $Y^1$ may additionally denote —F, —Cl, —OCF₃, —OCHF₂, —OCH₂F or —CF₃.

11. The liquid-crystalline medium as claimed in claim 10, wherein the liquid-crystalline medium comprises 10 wt.-% or more of the polar two-ring substances, 20 wt.-% or more of the neutral two ring substances, 30 wt.-% or less of weak-polar substances and 20 wt.-% or less of the three-ring substances.

12. An electro-optical display element containing a liquid-crystalline medium as claimed in claim 1.

13. An electro-optical display element containing a liquid-crystalline medium as claimed in claim 7.

14. An electro-optical display element containing a liquid-crystalline medium as claimed in claim 11.

15. The liquid-crystalline medium as claimed in claim 1, wherein the liquid crystalline medium comprises at least one strongly polar two-ring substance of the formulae (Ia) wherein one, two or three of $L^1, L^2, L^3$ and $L^4$ are fluorine and the others are hydrogen.

16. The liquid-crystalline medium as claimed in claim 1, wherein the liquid crystalline medium comprises at least one strongly polar two-ring substance of the formulae (Ia) wherein one of $L^1, L^2, L^3$ and $L^4$ are fluorine and the others are hydrogen.

17. The liquid-crystalline medium as claimed in claim 1, wherein the liquid crystalline medium comprises at least one strongly polar two-ring substance of the formulae (Ia) wherein two of $L^1, L^2, L^3$ and $L^4$ are fluorine and the others are hydrogen.

18. The liquid-crystalline medium as claimed in claim 1, wherein the liquid crystalline medium comprises at least one strongly polar two-ring substance of the formulae (Ia) wherein three of $L^1, L^2, L^3$ and $L^4$ are fluorine and the other is hydrogen.

* * * * *